United States Patent Office 3,096,065
Patented July 2, 1963

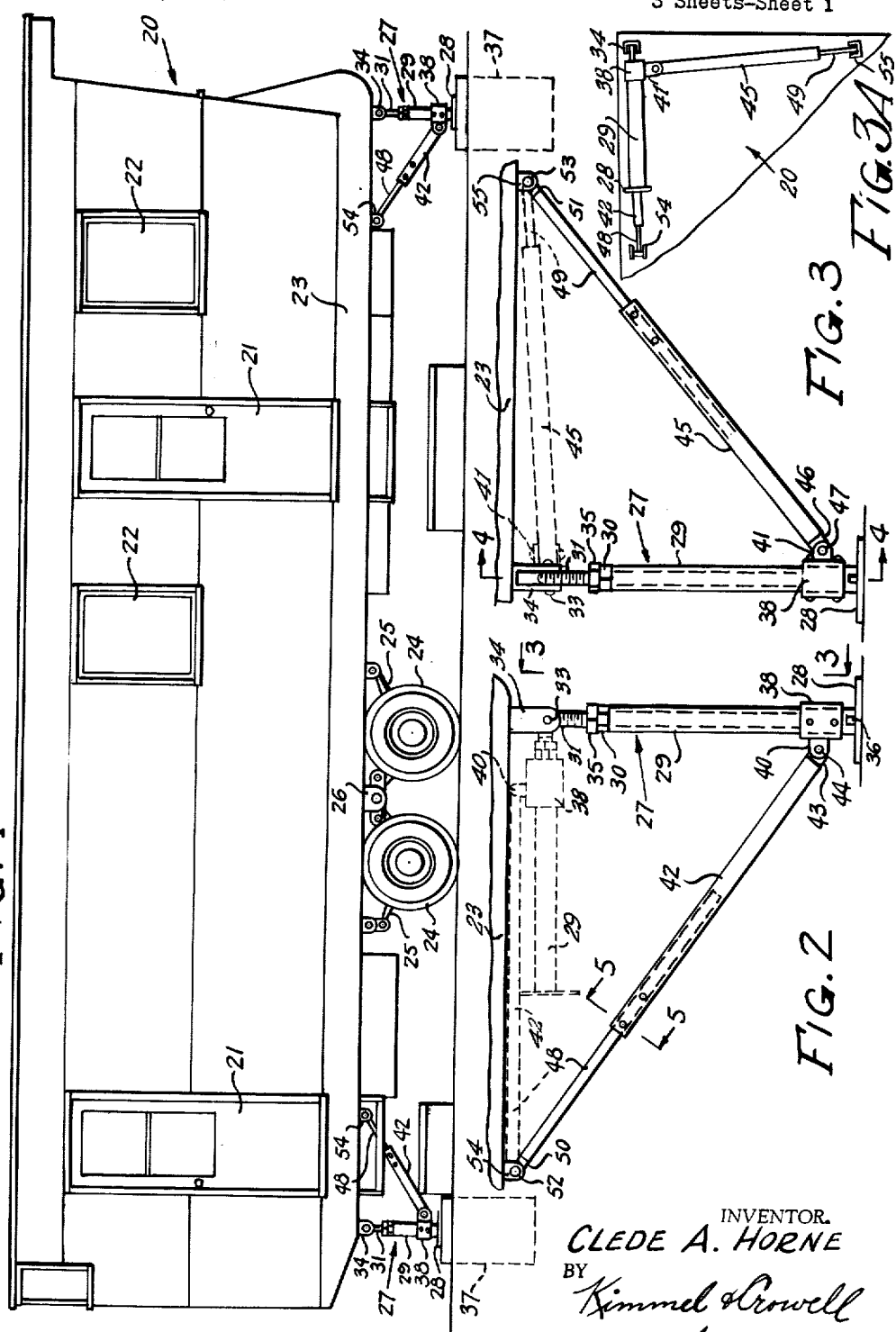

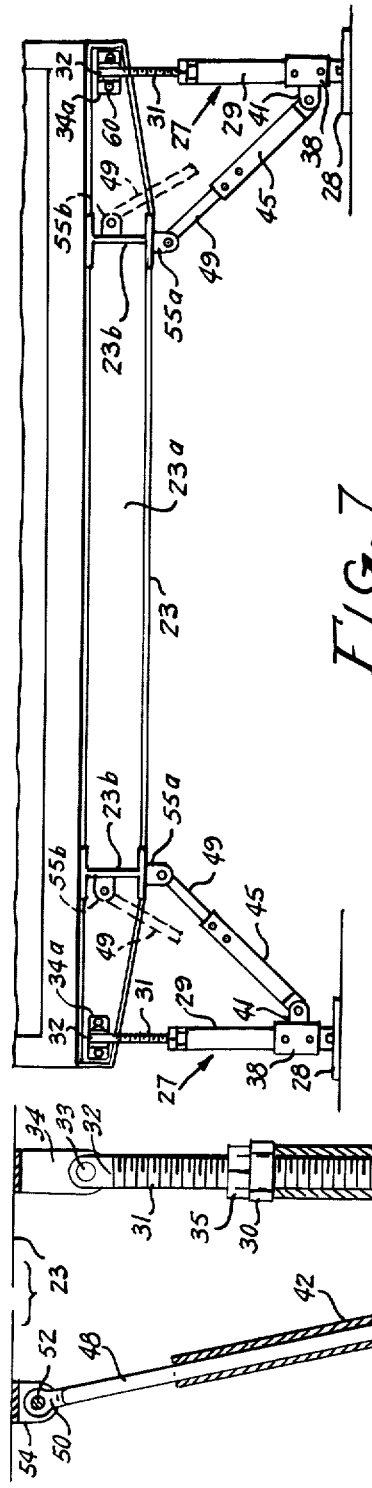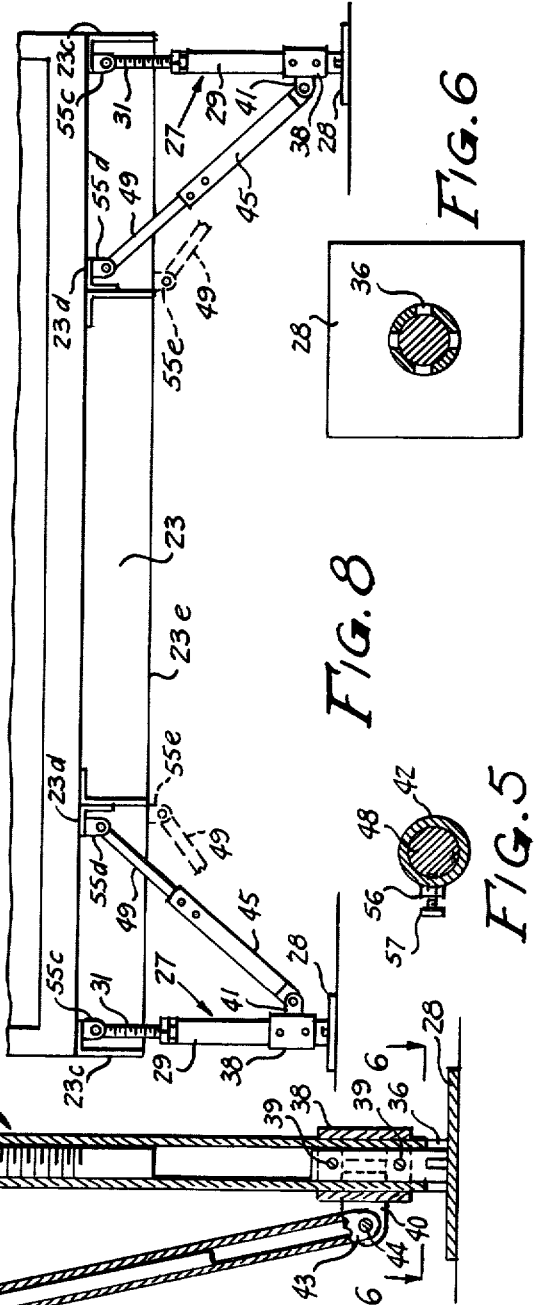

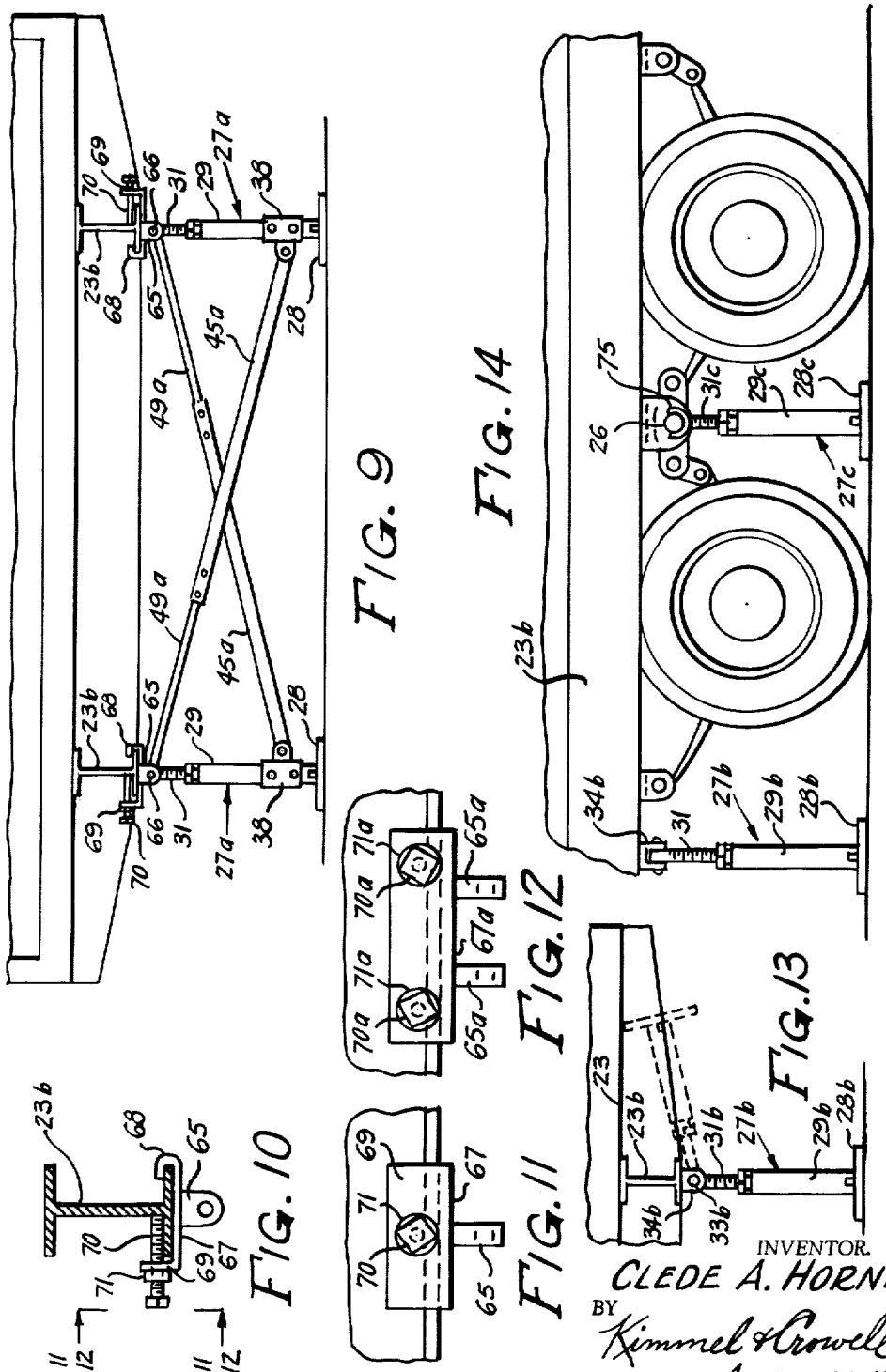

3,096,065
TRAILER STABILIZER
Clede A. Horn, Rte. 1, Lake Antoine,
Iron Mountain, Mich.
Filed Jan. 30, 1962, Ser. No. 169,793
5 Claims. (Cl. 248—354)

This invention relates to a trailer stabilizer, and has particular applicability to house trailers.

A primary object of the invention is the provision of a stabilizer which will support and retain a house trailer in level position after the same has been detached from a towing vehicle.

An additional object of the invention is the provision of a device of this character which is readily adjustable to different heights and different types of trailers, as well as differing terrain conditions.

A further object of the invention is the provision of a device of this character which may be readily attached to a trailer when the same is in a permanent or semi-permanent location, and which may be readily disassembled when it is desired to move the trailer.

An additional object of the invention is the provision of a device of this character which may be permanently secured to the trailer under certain conditions, and folded against the underside thereof when the trailer is in motion.

Still another object of the invention is the provision of a device of this character which is sturdy and durable in construction, reliable and efficient in operation, and relatively inexpensive and simple to manufacture, assemble, and utilize.

Still other objects reside in the combinations of elements, arrangements of parts, and features of construction, all as will be more fully pointed out hereinafter and shown in the accompanying drawings wherein there are disclosed preferred embodiments of this inventive concept.

In the drawings:

FIGURE 1 is a side elevational view of a house trailer supported at either end by the stabilizers of the instant invention.

FIGURE 2 is an enlarged side elevational view of one of the stabilizers of FIGURE 1 showing the folded position of the stabilizer in dotted lines.

FIGURE 3 is a view taken substantially at right angles to FIGURE 2, or substantially along the line 3—3 of FIGURE 2 showing the folded position of the stabilizer in dotted lines.

FIGURE 3A is a fragmentary bottom plan view to a smaller scale showing one of the stabilizers in the folded position.

FIGURE 4 is an enlarged sectional view taken substantially along the line 4—4 of FIG. 3 as viewed in the direction indicated by the arrows.

FIGURE 5 is an enlarged sectional view taken substantially along the line 5—5 of FIGURE 2 as viewed in the direction indicated by the arrows.

FIGURE 6 is a sectional view taken substantially along the line 6—6 of FIGURE 4 as viewed in the direction indicated by the arrows.

FIGURE 7 is an end elevational view of a trailer in accordance with FIGURE 1, parts thereof being broken away, showing one form of securing the transversely extending portions of the stabilizer to the tractor frame.

FIGURE 8 is a view similar to FIGURE 7 but showing a modified means for attaching the trailer device.

FIGURE 9 is a view similar to FIGURES 7 and 8 but showing a still further modification of the device in the means of attachment to the trailer frame, and in the interconnection of adjacent stabilizers.

FIGURE 10 is an enlarged detail view of the attaching means of FIGURE 9, the supporting beam of the trailer being shown in section.

FIGURE 11 is an end elevational view taken substantially along the line 11—11 of FIGURE 10.

FIGURE 12 is a modified form of construction also taken substantially along the line 12—12 of FIGURE 10.

FIGURE 13 is a side elevational view of a modified form of stabilizer showing its folded position in dotted lines; and FIGURE 14 is a fragmentary enlarged side elevational view of the construction of FIGURE 1 showing an additional means for connecting the stabilizer to the trailer and at a different location.

Similar reference characters refer to similar parts throughout the several views of the drawings.

Having reference now to the drawings in detail, there is generally indicated at 20 a house trailer of any desired conventional type provided with side access doors 21, windows 22, the usual supporting frame members 23, and paired wheels 24 mounted on springs 25 which are pivotally interconnected as by a pivot member 26.

The trailer stabilizer of the instant invention is generally indicated at 27, and in the illustrative embodiment of the invention herein shown, one of these stabilizers is positioned at each corner of the house trailer, in order to support the same in level position.

Since the stabilizers in each form are substantially identical, only one will be described in detail.

As best shown in FIGURE 4, the stabilizer comprises a base 28 on which is seated a tubular upright 29 which has affixed to the top thereof a nut 30. The nut 30 may be rotatably secured to the top of the tubular upright 29 or the upright 29 may be rotatable with respect to the base 28 to threadably accommodate a shaft 31. The shaft 31 is provided at its upper end with a lug 32, which is adapted to be secured as by means of a pin 33 between a pair of lugs 34 which depend from the underside of the frame 23 at each corner thereof. A locking nut 35 surrounds the shaft 31 for suitably securing the same in position after adjustment. The lower end of sleeve 29 is slotted as at 36 to provide accommodation for a tool or the like for turning the jack for alignment purposes, after the same has had its base plate 28 suitably positioned on a cement mounting block 37 or the like, in the semi-permanent location of the trailer. A sleeve 38 surrounds the lower portion of the tubular member 29, and is secured in position by means of set screws 39. When the set screws 39 are released the tubular member 29 may be rotated with respect to the base 28 for adjustment of the stabilizer if these elements are rotatably mounted with respect to each other. Sleeve 38 has a first pair of lugs 40 extending therefrom longitudinally of the trailer, and a second pair of lugs 41 positioned at substantially right angles to lugs 40 and extending in a direction transversely of the ends of the trailer. A tubular member 42 provided with a flattened end 43 is pivoted as by means of a pin 44 between the lugs 40, while a corresponding tubular member 45 having a flattened end 46 is secured as by means of a pin 47 between the lugs 41, so that the tubular members 42 and 45 extend at substantially right angles to each other. Tubular members 42 and 45 each have mounted therein a rod 48 and 49, respectively, positioned for sliding movement, each rod being provided with a flattened end 50 and 51, respectively which in turn are secured by means of pins 52 and 53, respectively, between pairs of lugs 54 positioned inwardly of the body relative to lugs 34 and in longitudinal alignment therewith, and a similar pair of lugs 55 secured inwardly of the body and transversely thereof at the ends, the arrangement thus being such that a three point stabilization is effected at each corner of the trailer. The mounting of the rod 49 in the lugs 55 may be relatively loose laterally to allow slight angular movement of the tubular member 45 and rod 49 when the same is folded into the stabilizing position, if necessary.

Tubular members 42 and 45, respectively, are each provided with threaded lugs 56 containing set screws 57, as best shown in FIGURE 5, for the retention of their respective slidable rods 48 and 49 in adjusted position.

In the use and operation of the device it will thus be readily apparent that the base 28 is first suitably aligned with the supporting block 37, after securement to the associated lugs on the underside of the house trailer, and then adjusted as to height by means of the nuts 30 and 35. Slidable rods 48 and 49 are left free to slide in their associated tubular members 42 and 45 until a normal level support is achieved, at which time they are locked in position by means of the set screws 57, as previously described.

The device may be folded into its traveling position by first releasing the set screws 39 securing the sleeve 38 to the tubular member 29 and the set screws 57 securing the slidable rods 48 and 49 in the tubular members 42 and 45 respectively. Then the tubular upright 29 is adjusted upwardly on the threaded shaft 31 as much as possible. The sleeve 38 is then slid upwardly on the tubular upright 29 until it abuts the nut 30 and the rods 48 and 49 are slid inwardly within the tubular members 42 and 45 respectively. The rods 48 and 49 are then folded about their pivotal mounting on pins 52 and 53 within lugs 54 and 55 respectively and the threaded shaft 31 is folded about its pivotal mounting on pin 33 within lugs 34. The folded or collapsed position will be seen in dotted lines in FIGURES 2 and 3 and in full lines in FIGURE 3A. It will be noted that the tubular member 45 turns 90° on its associated rod 49 in order to accommodate the folded position of the lugs 41. The elements may be maintained in their folded position by tightening the set screws or any conventional holding means such as a chain or the like may be used to secure them in place.

FIGURE 7 shows a modified form of mounting the units 27 on a trailer frame, the units 27 being identical to those previously described, with the exception of the fact that the flattened end 32 of rod 31 extends between a pair of lugs 34a which extend horizontally from the transverse frame members 23a, being suitably secured thereto as by means of rivets or bolts 60. Similarly, the flattened end of transversely extending rod 49 is secured between a pair of lugs 55a which are secured as by welding, or in any other desired manner to the underside of an I beam 23b extending longitudinally of the trailer affording support therefor. In a still further modification the lugs may be secured to the side of the beams 23b as indicated at 55b. Still another modification is disclosed in FIGURE 8, wherein the stabilizing members 27 are identical to that type previously disclosed, but wherein the flattened ends of the threaded members 31 are secured between lugs 55c disposed on the underside of a horizontal flange of a longitudinally extending angle iron 23c, while alternative lugs 55d are secured to the underside of an angle iron 23d extending longitudinally and centrally of the trailer frame 23. Alternatively, the lugs may be positioned as at 55e on the underside of transverse angle irons 23e.

Still another modified form of construction is shown in FIGURE 9 wherein the stabilizers generally indicated at 27a are substantially identical to the stabilizers 27 and include threaded rods 31 having flattened ends rotatably mountable in tubular sleeves or members 29, the members 29 each being provided with a sleeve 38 to which are attached tubular members 45a, the tubular members being substantially identical with those of the foregoing modification except substantially elongated, and containing elongated rods 49a. In this form of the invention, lugs 65 adapted for the reception of pins 66 are secured to the underside of plates 67, the pins 66 serving to hold both the ends of threaded members 31 and the flattened ends of rods 49a to the same lug on opposite sides of the trailer. When employing this form of lug on a trailer including longitudinally extending I beams 23b are necessary. Plates 67 include reverted end portions 68 which are adapted to engage over one side of the lower flange of I beam 23b, and upright portions 69 on their opposite sides comprising flanges, the flanges being provided with openings for the accommodation of clamping bolts 70, which are secured in clamping relation by lock nuts 71.

In FIGURE 11 the assembly is shown as secured in position by a single bolt 70. However, FIGURE 12 discloses a modified form of construction wherein the plate 67a is slightly wider than plate 67 and wherein two lugs 65a identical to the lugs 65, are provided with bolts 70a, each identical to the bolt 70, and provided with lock nuts 71a.

FIGURES 13 and 14 discloses a still further modified form of stabilizer generally indicated at 27b, which is characterized particularly by the absence of the transversely extending lugs 41, there being provided only a tubular member 29b seating on a base 28b and provided with a threaded member 31b having a flattened end which is secured by means of a pin 33b between lugs 34b permanently secured to the underside of either longitudinal or transverse frame members 23b. Any conventional means may be used to secure the stabilizer in its folded position as shown in dotted lines. In FIGURE 14 there is shown a still further modified form of stabilizer construction at 27c, which includes a tubular member 29c mounted on a base 28c and having a threaded member 31c, which instead of terminating in the flattened end of the previously described modifications and seating between spaced lugs, terminates in a bifurcated arcuate terminal portion 75 which seats under the end of the centrally located pivot 26 of FIGURE 1 for additional longitudinal stabilization of the device.

The use of all the connections and modifications hereinbefore described is identical with that described in connection with the trailer of FIGURE 1, and obviously any requisite number of corner or intermediate stabilizers may be employed in accordance with the length and weight of the house trailer.

While the stabilizer has also been described particularly in conjunction with a house trailer, it may be equally advantageously employed with other types of vehicles or structures requiring leveling or stabilization.

From the foregoing it will now be seen that there is herein provided an improved stabilizer which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In a trailer stabilizer, the combination of a longitudinally adjustable tubular upright means having an upper end and a lower end, means for pivotally securing said upper end to the underside of a trailer, sleeve means slidingly and rotatably received over said tubular upright means, a first longitudinally adjustable tube and rod means having an upper end and a lower end, means pivotally securing said lower end of said first tube and rod means to said sleeve means, means pivotally securing said upper end of said first tube and rod means to the underside of said trailer remote from the point where said tubular upright means is secured thereto, a second longitudinally adjustable tube and rod means having an upper end and a lower end, means pivotally securing said lower end of said second tube and rod means to said sleeve means at right angles to said first tube and rod means, means pivotally securing said upper end of said second tube and rod means to the underside of said trailer remote from the point where said tubular upright means is secured thereto and remote from the point where said first tube and rod means is secured thereto.

2. The structure of claim 1 wherein locking means are provided to secure each of said first and second tube and rod means in adjusted relationship.

3. The structure of claim 1 wherein said means for pivotally securing said tubular upright means and each of said first and second tube and rod means to the underside of said trailer includes spaced pairs of lugs secured to the underside of said trailer, flattened members on the upper ends of said tubular upright means and each of said first and second tube and rod means and a pin extending through each pair of lugs and the associated flattened member.

4. The structure in accordance with claim 1 wherein said means for pivotally securing said tubular upright means to the underside of said trailer includes a transverse pivot pin carried by said trailer and a bifurcated portion in the upper end of said tubular upright means adapted to engage under said pivot pin.

5. The structure of claim 1 wherein said means for pivotally securing said upper end of said tubular upright means to the underside of a trailer is adapted to be pivotally secured to an I-beam fixed to the underside thereof and having a vertical web and a lower transverse flange, said last-mentioned means including a flattened member on the upper end of said tubular upright means, a plate including at least one lug means depending therefrom, a reverted end on said plate adapted to engage over one edge of the lower transverse flange of the I-beam, an upright flange on the side of said plate opposite from said reverted end, a bolt extending through the upright flange and adapted to engage said vertical web of the I-beam and a pin means pivotally securing said flattened member of said tubular upright means and said lug means on said plate.

References Cited in the file of this patent
UNITED STATES PATENTS

| | | |
|---|---|---|
| 1,228,983 | Souther | June 5, 1917 |
| 1,309,511 | De Cesare | July 8, 1919 |
| 1,489,104 | Armington | Apr. 1, 1924 |
| 2,519,364 | Fredholm | Aug. 22, 1950 |
| 2,532,168 | Jakoubek | Nov. 28, 1950 |
| 2,770,886 | Johnson | Nov. 20, 1956 |
| 2,734,726 | Gebhart | Feb. 14, 1956 |
| 3,027,140 | Holzbach | Mar. 27, 1962 |

UNITED STATES PATENT OFFICE
CERTIFICATE OF CORRECTION

Patent No. 3,096,065                          July 2, 1963

Clede A. Horne

It is hereby certified that error appears in the above numbered patent requiring correction and that the said Letters Patent should read as corrected below.

In the grant, lines 1 and 12, in the heading to the printed specification, line 3, for "Clede A. Horn", each occurrence, read -- Clede A. Horne --.

Signed and sealed this 31st day of December 1963.

(SEAL)
Attest:

ERNEST W. SWIDER

Attesting Officer

EDWIN L. REYNOLDS

Acting Commissioner of Patents